(12) United States Patent
Tsukamoto

(10) Patent No.: US 6,959,998 B2
(45) Date of Patent: Nov. 1, 2005

(54) PORTABLE ILLUMINATOR UNIT

(75) Inventor: Satoshi Tsukamoto, Sakai (JP)

(73) Assignee: Cateye Co., Ltd., Osaka (JP)

( * ) Notice: Subject to any disclaimer, the term of this patent is extended or adjusted under 35 U.S.C. 154(b) by 36 days.

(21) Appl. No.: 10/800,906

(22) Filed: Mar. 15, 2004

(65) Prior Publication Data
US 2004/0190287 A1 Sep. 30, 2004

(30) Foreign Application Priority Data
Mar. 25, 2003 (JP) .............................. 2003-082183

(51) Int. Cl.[7] .................................................. F21L 4/00
(52) U.S. Cl. ....................... 362/191; 362/108; 362/473
(58) Field of Search ............................... 362/104, 108, 362/105, 190, 191, 196, 208, 473–476

(56) References Cited

U.S. PATENT DOCUMENTS

| 192,197 A | 6/1877 | Snively | |
| 3,794,825 A | 2/1974 | Krupansky | 240/10.63 |
| 5,649,758 A * | 7/1997 | Dion | 362/103 |
| 5,921,664 A * | 7/1999 | Lee | 362/190 |

FOREIGN PATENT DOCUMENTS

| DE | 10048277 | 5/2002 |
| EP | 1 291 577 | 3/2003 |
| FR | 2798446 | 3/2001 |
| GB | 1 505 011 | 3/1978 |
| JP | 4-100975 | 9/1992 |

* cited by examiner

Primary Examiner—Stephen F Husar
(74) Attorney, Agent, or Firm—Olson & Hierl, Ltd.

(57) ABSTRACT

The illuminator unit has a case body constituting the illuminator body. At the side peripheral portion of the case body, a side peripheral groove formed of an inward concave groove is provided through the full circumference. A rubber band is arranged along the side peripheral groove. With this configuration, it is possible to provide a portable illuminator unit whose body can be attached to a receiving member without the need of a bracket or the like, and whose attaching place can readily be changed.

7 Claims, 4 Drawing Sheets

PORTABLE ILLUMINATOR UNIT

BACKGROUND OF THE INVENTION

1. Field of the Invention

The present invention relates to a portable illuminator unit, and more particularly to a portable illuminator unit having a structure attachable anywhere.

2. Description of the Background Art

A bicycle or the like is usually provided with a headlight for ensuring safety in running at night, a reflector plate (or a region processed to serve as a reflector) for reflecting light emitted from a headlight of an automobile or the like to make others aware of its existence, and/or a self-luminous type light emitting device such as a LED (light emitting diode). To attach such a light emitting device to a bicycle, a part mounting device for a two-wheeled vehicle disclosed in Japanese Utility Model Laying-Open No. 4-100975, for example, is employed.

In the case of a conventional light emitting device or the like, however, a mounting bracket dedicated to attachment of the light emitting device body to a bicycle is required. The place for attachment of the bracket itself is restricted, and once the attaching place is fixed, it cannot readily be changed. Such problems arise, not only in the light emitting device to be attached to a bicycle or the like, but also in any other light emitting device requiring a bracket for attachment to a motorcycle or the like.

SUMMARY OF THE INVENTION

The present invention has been made to solve the above problems, and its object is to provide a portable illuminator unit of which body can be attached without the need of a bracket or the like, and of which attaching place can readily be changed.

To solve the above-described problems, a portable illuminator unit according to the present invention includes: a body portion of a prescribed thickness, having a side peripheral groove formed of an inward concave groove at its side peripheral portion, and having an illuminator provided therein; a string member arranged along the side peripheral groove, and having its end portions connected together in a state exposed from the side peripheral groove; and a string member holding member provided to the body portion, and preventing the string member from slipping off the side peripheral groove.

According to the portable illuminator unit of this configuration, the body portion provided with the illuminator can be attached to another article with the string member. Thus, the body portion can be attached anywhere, without restriction on the attaching place.

Further, since the string member is arranged along the side peripheral groove, its protrusion onto the surface side of the body portion can be prevented, which would otherwise interrupt the illuminator provided in the body portion. Accordingly, it is possible to provide, even in a relatively small body portion, an illuminator effectively utilizing the entire surface region thereof.

Preferably, the illuminator has a self-luminous light emitting device. Still preferably, the light emitting device includes a reed switch capable of controlling on/off of the device by approach/withdrawal of magnetism. A magnet for controlling the reed switch is mounted in the string member.

With this configuration, in the case of use at night, emission of the light emitting device makes others fully aware of its position or existence even in a dark place, so that contingencies in terms of traffic safety and security can be avoided. Further, the magnet for controlling the reed switch is mounted in the string member to prevent loss thereof, which affords convenience to the user.

Still preferably, the illuminator has a reflector member provided on at least one surface side of the body portion and reflecting the external light. With this configuration, again, it is possible to attract others' attention to its position or existence at night, to avoid contingencies in terms of traffic safety and security.

Still preferably, the string member is made of an elastic member, and the illuminator unit further includes a length adjuster member for adjustment in length of a portion of the string member wound around the side peripheral groove. As such, the elastic force of the string member can be utilized to attach the body portion to another article, so that the body portion is biased toward the article, which prevents displacement of the body portion with respect to the article, and facilitates attachment of the body portion. Detachment of the body portion is also facilitated.

Still preferably, a notch region is provided at the peripheral portion on at least one surface side of the body portion. The notch region allows the string member to exit from the side peripheral groove therethrough, and also enables engagement of the string member therein. With the string member passed through this region, it is readily possible to adjust an attaching angle of the body portion to another article, improving handiness thereof.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, structures of the portable illuminator units according to embodiments of the present invention will be described with reference to the drawings.

(Structure of Portable Illuminator Unit 1A)

Firstly, an overall structure of the portable illuminator unit 1A according to an embodiment of the present invention is described with reference to FIGS. 1 and 2.

Figure 1:
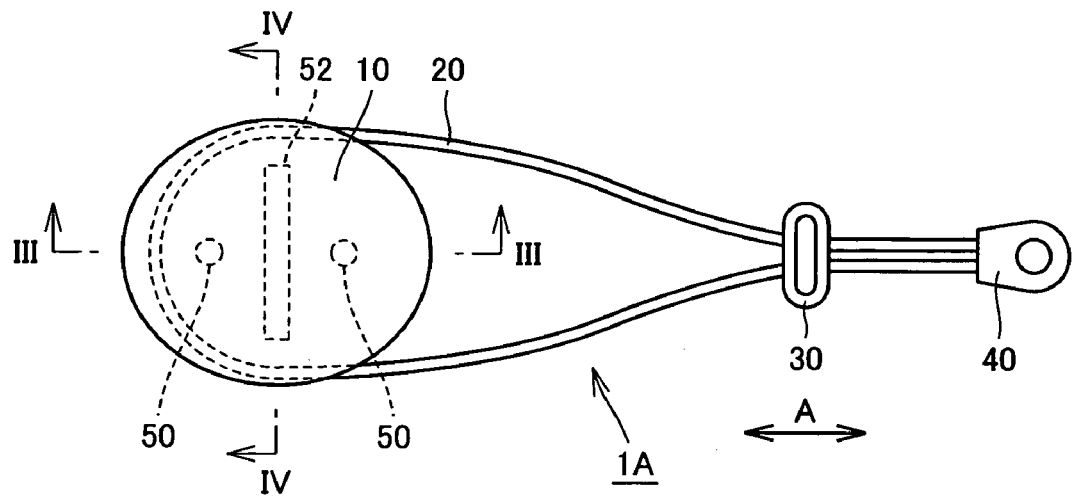
FIG. 1 is a top plan view of a portable illuminator unit according to an embodiment of the present invention.
Figure 2:
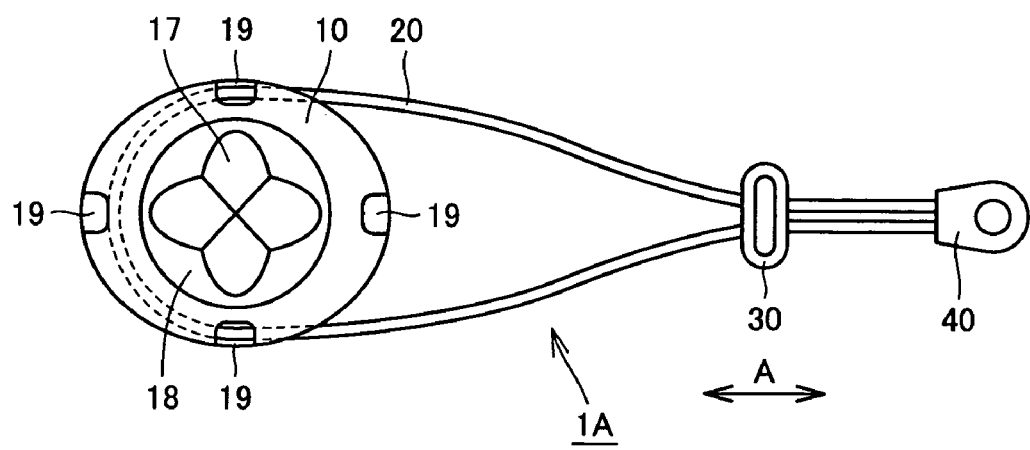
FIG. 2 is a bottom plan view of the portable illuminator unit of the embodiment.

This portable illuminator unit 1A includes: a case body 10 as a body portion having a prescribed thickness; a rubber band 20 as a string member arranged such that a portion of rubber band 20 is wound around the side peripheral portion of case body 10; a connecting member 40 made of resin for connecting the end portions of rubber band 20 together in a state extending outward from case body 10; and an adjuster 30 for adjusting the length of the portion of rubber band 20 wound around case body 10 (by sliding it in directions shown by an arrow A in FIG. 1).

Case body 10 has an outer shape of approximately ellipse, with a major axis of about 42 mm and a minor axis of about 38 mm. It is about 16 mm thick at the central region and about 8 mm thick at the peripheral end region.

Case body 10 has a side peripheral groove 13 (as will be described later) at its side peripheral portion through the full circumference. Side peripheral groove 13 is formed of an inward concave groove, along which rubber band 20 is arranged.

Case body 10 houses LEDs 50, 50 as illuminators for emitting light toward the surface side of case body 10. LEDs 50, 50 are provided with a reed switch 52 capable of controlling on/off thereof by approach/withdrawal of magnetism. A magnet for the control of reed switch 52 is mounted in connecting member 40. This on/off control of LEDs 50, 50 by approach/withdrawal of magnetism may be continuous on/off, intermittent on/off or the like.

At the back surface side of case body 10, four notches 19 are provided at the peripheral portion, at an interval of about 90 degrees with each other. Each notch 19 provides an opening through which rubber band 20 can exit from side peripheral groove 13. Notch 19 can also engage rubber band 20 therein. The back surface side of case body 10 has a region 18 processed to serve as a reflector for reflecting external light, although a reflector plate having undergone the processing for a reflector may be applied thereto. A cross-shaped concave region 17 is also provided at the back surface side.

Figure 3:
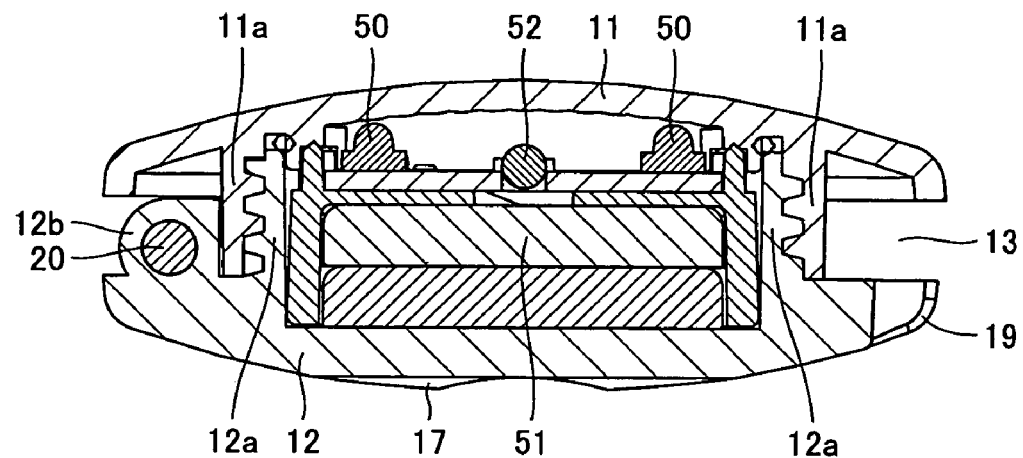
FIG. 3 is a cross sectional view taken along the line III—III in FIG. 1.
Figure 4:
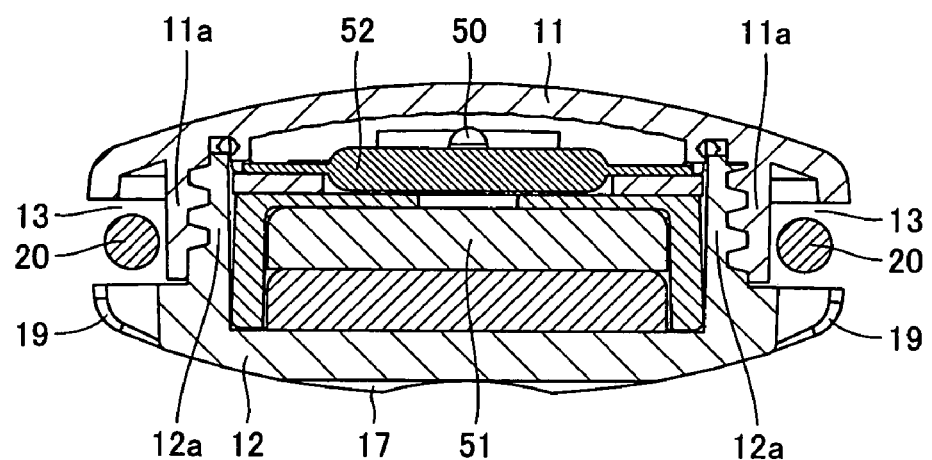
FIG. 4 is a cross sectional view taken along the line IV—IV in FIG. 1.

A detailed structure of case body 10 is now described with reference to FIGS. 3 and 4.

Case body 10 has a structure divided into the front surface side and the back surface side, i.e., a first case 11 and a second case 12 of resin molded parts. Particularly, first case 11 is formed of a resin material having light transmittance of a certain degree so as to externally transmit the lights emitted from internally provided LEDs 50, 50. The inner surface of first case 11 may be processed to have prescribed unevenness to constitute a Fresnel lens or the like, so as to spread the lights emitted from LEDs 50, 50.

First case 11 is provided with a female screw region 11a, and second case 12 is provided with a male screw region 12a. Female and male screw regions 11a and 12a are screwed as shown in FIG. 3 to firmly connect first and second cases 11 and 12. It is noted that a seal member may be interposed between first and second cases 11 and 12 to improve waterproofing property inside the case body.

First and second cases 11 and 12 define the side peripheral groove 13 of case body 10. Second case 12 is provided with a guide region 12b having a through hole to pass and hold rubber band 20 therethrough to prevent rubber band 20 from slipping off side peripheral groove 13.

A control device 51 (including a battery) for controlling on/off of LEDs 50, 50 is mounted inside case body 10. In the present embodiment, for the purposes of ensuring control of reed switch 52 by connecting member 40 with the built-in magnet and efficiently housing LEDs 50, 50 and reed switch 52 (without increasing the volume), LEDs 50, 50 are arranged at relatively outer sides, and reed switch 52 is arranged between LEDs 50, 50 in a direction orthogonal to the straight line connecting LEDs 50, 50.

(State of Use, Function and Effects)

Figure 5:
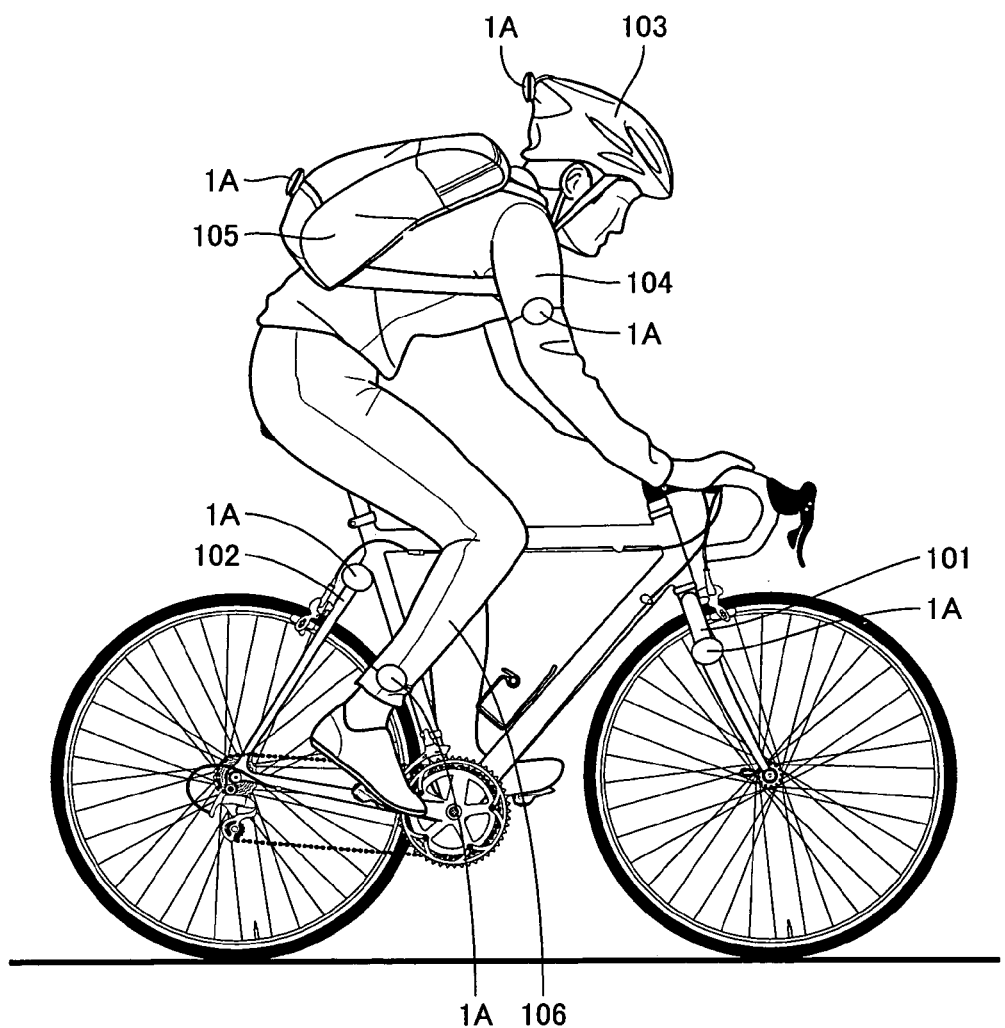
FIG. 5 illustrates how the portable illuminator unit can be attached to a bicycle or a bicycle rider.

The state of use of portable illuminator unit 1A is now described with reference to FIG. 5.

According to portable illuminator unit 1A of the above-described configuration, rubber band 20 can be used to attach case body 10, so that it can be attached anywhere, without restriction on the attaching place. In the case of a bicycle, it may be attached to a front fork 101, a back fork 102, or, although not shown, to a handlebar or a seat post. In some cases, it may be attached even to a rim by appropriately selecting a shape of case body 10.

Case body 10 may be attached, not only to a bicycle, but also to a bicycle rider using rubber band 20. Specifically, it may be attached to a helmet 103, a day bag 105, or even to an arm region 104, a leg region 106 or another body part of the rider.

Since the elastic force of rubber band 20 is utilized to attach case body 10 to a bicycle or a bicycle rider, case body 10 can be biased toward the bicycle or the rider, which prevents displacement of case body 10 and facilitates attachment of case body 10. Case body 10 can readily be detached as well. Further, providing notches 19 at the peripheral portion on the back surface side of case body 10 and passing rubber band 20 through notches 19 make it possible to readily adjust the attaching angle of case body 10.

Since rubber band 20 is arranged along side peripheral groove 13, rubber band 20 is prevented from protruding toward the surface side of case body 10 to interrupt the lights emitted from LEDs 50, 50. Thus, the emission of LEDs, 50, 50 can fully be utilized.

Figure 6:
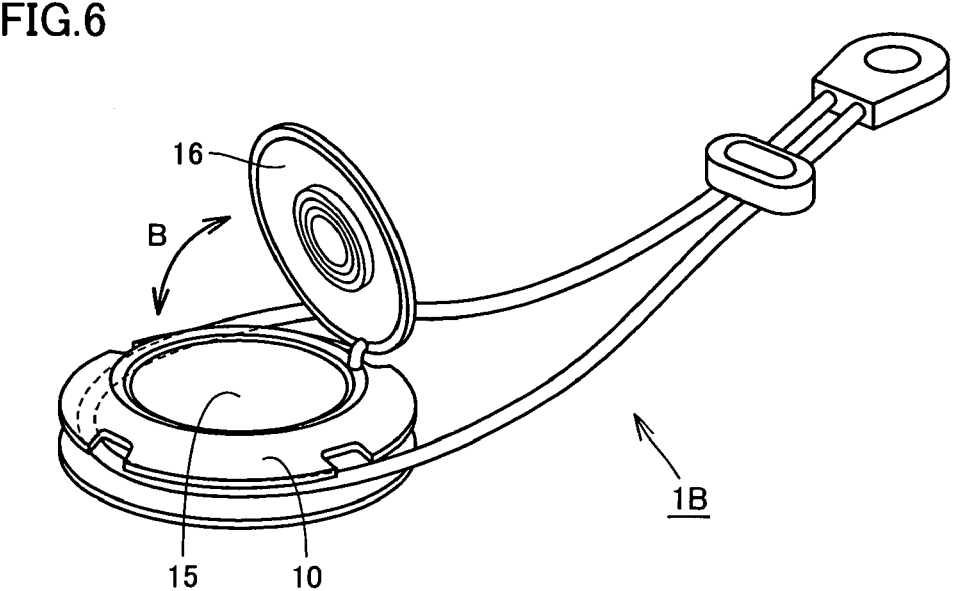
FIG. 6 is a perspective view from a bottom side of a portable illuminator unit according to another embodiment of the present invention.
Figure 7:
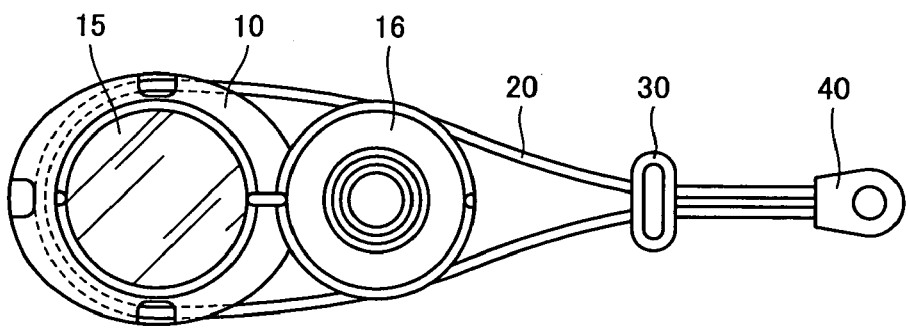
FIGS. 7 and 8 each show a bottom plan view of a portable illuminator unit according to yet another embodiment of the present invention.
Figure 8:
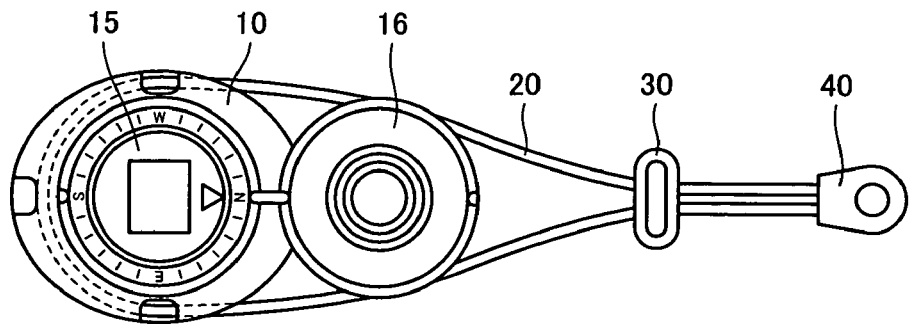

A conceivable modification 1B of portable illuminator unit 1A is shown in FIGS. 6–8. For example, as shown in FIG. 6, a concave space 15 having a certain volume and a cover 16 for opening/closing concave space 15 (in directions as shown by an arrow B in FIG. 6) may be provided on the back surface side of portable illuminator unit 1A. This cover 16 may be formed of resin, rubber or the like. Further, as shown in FIG. 7, concave space 15 may contain an emergency mirror, a name plate, a medical information card of a user or the like. It may also contain a compass, as shown in FIG. 8.

In the above-described portable illuminator units 1A and 1B, the shape of case body 10 is not limited to the one explained in the present embodiment. It may have a circular, rectangular, or any other shape in design. Further, rubber band 20 may be formed of various materials, as long as it constitutes a string member preferably having elasticity. Still further, case body 10 does not have to be a casing accommodating a device inside, if it is unnecessary to house the light emitting device, such as LEDs 50, 50, or the like. Case body 10 may be formed of one or two plate-shaped members of a prescribed thickness.

The above-described portable illuminator units 1A and 1B merely disclose the preferable states of use. For example, LEDs 50, 50 may be replaced with reflector plates provided on respective surfaces of case body 10.

According to the present invention, it is possible to provide a portable illuminator unit whose body can be attached without the need of a bracket or the like, and whose attaching place can readily be changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable illuminator unit, comprising:
 a body portion of a prescribed thickness, having a side peripheral groove formed of an inward concave groove at its side peripheral portion, and having an illuminator provided therein;
 a string member arranged along said side peripheral groove and having its end portions connected together in a state exposed outward from said side peripheral groove; and
 a string member holding member provided to said body portion and preventing said string member from slipping off said side peripheral groove.

2. The portable illuminator unit according to claim 1, wherein said illuminator has a self-luminous light emitting device.

3. The portable illuminator unit according to claim 2, wherein
 said light emitting device includes a reed switch capable of controlling on/off of said light emitting device by approach/withdrawal of magnetism, and
 said string member has mounted therein a magnet for control of said reed switch.

4. The portable illuminator unit according to claim 1, wherein said illuminator has a reflector member provided on at least one surface side of said body portion and reflecting external light.

5. The portable illuminator unit according to claim 1, wherein said string member is formed of an elastic member.

6. The portable illuminator unit according to claim 1, further comprising a length adjuster member for adjusting a length of a portion of said string member wound around said side peripheral groove.

7. The portable illuminator unit according to claim 1, wherein a notch region is provided at the peripheral portion on at least one surface side of said body portion, the notch region allowing said string member to exit from said side peripheral groove therethrough and also enabling engagement of said string member therein.

* * * * *